United States Patent
Chen (10) Patent No.: US 11,076,041 B2
(45) Date of Patent: Jul. 27, 2021

(54) AMBIENT LIGHT DETECTION METHOD AND APPARATUS, AND STORAGE MEDIUM

(71) Applicant: BEIJING XIAOMI MOBILE SOFTWARE CO., LTD., Beijing (CN)

(72) Inventor: Chaoxi Chen, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 0 days.

(21) Appl. No.: 16/885,470

(22) Filed: May 28, 2020

(65) Prior Publication Data

US 2021/0185167 A1 Jun. 17, 2021

(30) Foreign Application Priority Data

Dec. 16, 2019 (CN) .......................... 201911294297.6

(51) Int. Cl.
*H04M 1/72454* (2021.01)
*G09G 3/34* (2006.01)
*G09G 5/10* (2006.01)
*G09G 3/3225* (2016.01)

(52) U.S. Cl.
CPC ...... *H04M 1/72454* (2021.01); *G09G 3/3225* (2013.01); *G09G 3/3413* (2013.01); *G09G 5/10* (2013.01); *G09G 2320/0233* (2013.01); *G09G 2320/0626* (2013.01); *G09G 2360/144* (2013.01)

(58) Field of Classification Search
CPC ............ H04M 1/72454; G09G 3/3225; G09G 3/3413; G09G 5/10; G09G 2320/0233; G09G 2320/0626; G09G 2360/144
See application file for complete search history.

(56) References Cited

FOREIGN PATENT DOCUMENTS

| CN | 107835324 A | 3/2018 |
| CN | 107945769 A | 4/2018 |
| CN | 109855727 A | 6/2019 |

OTHER PUBLICATIONS

Zhang et al., "Ambient light detection method and device, storage medium and electronic device" Apr. 20, 2018 (Year: 2018).*
Jia, "Ambient light detection method, apparatus, electronic device and storage medium" Jun. 7, 2019 (Year: 2019).*
Lei, "Backlight brightness adjusting method and mobile terminal" Mar. 23, 2018 (Year: 2018).*
OA for EP application 20180590.0, dated Oct. 9, 2020.

* cited by examiner

*Primary Examiner* — Peter D McLoone
(74) *Attorney, Agent, or Firm* — Syncoda LLC; Feng Ma (57) ABSTRACT

An ambient light detection method includes: in response to monitoring that a current backlight level of a display screen exceeds a preset backlight level threshold, acquiring an image grayscale value sent by a driving portion in the display screen; compensating a first gray level value collected by a light sensor by using the image grayscale value to obtain a current gray level value, the current gray level value being configured to represent a gray level corresponding to current external ambient light detected by the light sensor; and acquiring illumination intensity of the current external ambient light based on the current gray level value, the illumination intensity being used as a basis for adjusting backlight brightness of the display screen.

20 Claims, 4 Drawing Sheets

--- in response to monitoring that a current backlight level of the display screen exceeds a preset backlight level threshold, acquiring an image grayscale value sent by a driving module in the display screen — 101 compensating a first gray level value collected by the light sensor by using the image grayscale value to obtain a current gray level value, the current gray level value being configured to represent a gray level corresponding to current external ambient light detected by the light sensor — 102 acquiring illumination intensity of the current external ambient light based on the current gray level value, the illumination intensity being used as a basis for adjusting backlight brightness of the display screen — 103

AMBIENT LIGHT DETECTION METHOD AND APPARATUS, AND STORAGE MEDIUM

CROSS-REFERENCE TO RELATED APPLICATION

The present application claims priority to Chinese Patent Application No. 201911294297.6 filed on Dec. 16, 2019, the disclosure of which is hereby incorporated by reference in its entirety.

BACKGROUND

Screen-to-body ratios of display screens in electronic devices tend to be increasing among new product, making the full screen solution a trend. For a full-screen electronic device, various sensors (such as a light sensor) originally arranged on a side of the display screen may need to be placed underneath the full screen. Taking the light sensor as an example, after external ambient light passes through the full screen, the light sensor collects the light to acquire illumination intensity.

SUMMARY

The present disclosure relates generally to the field of display technologies, and more specifically to an ambient light detection method and apparatus, and a storage medium.

According to embodiments of the present disclosure, an ambient light detection method, which can be applied to an electronic device with a light sensor arranged under a display screen, is provided. The ambient light detection method includes: in response to monitoring that a current backlight level of the display screen exceeds a preset backlight level threshold, acquiring an image grayscale value sent by a driving portion in the display screen; compensating a first gray level value collected by the light sensor by using the image grayscale value to obtain a current gray level value, in which the current gray level value is configured to represent a gray level corresponding to current external ambient light detected by the light sensor; and acquiring illumination intensity of the current external ambient light based on the current gray level value, in which the illumination intensity is used as a basis for adjusting backlight brightness of the display screen.

According to embodiments of the present disclosure, an ambient light detection apparatus, which can be applied to an electronic device with a light sensor arranged under a display screen, is provided. The apparatus includes: one or more processors; a memory storing instructions executable by the one or more processors; in which the one or more processors are configured to: in response to monitoring that a current backlight level of the display screen exceeds a preset backlight level threshold, acquire an image grayscale value sent by a driving portion in the display screen; compensate a first gray level value collected by the light sensor by using the image grayscale value to obtain a current gray level value, in which the current gray level value is configured to represent a gray level corresponding to current external ambient light detected by the light sensor; and acquire illumination intensity of the current external ambient light based on the current gray level value, in which the illumination intensity is used as a basis for adjusting backlight brightness of the display screen.

According to embodiments of the present disclosure, a non-transitory computer-readable storage medium having an executable instruction stored thereon is provided. When the executable instruction is executed by the light sensor core, an ambient light detection method, which is applied to an electronic device with a light sensor arranged under a display screen, is implemented. The ambient light detection method includes: in response to monitoring that a current backlight level of the display screen exceeds a preset backlight level threshold, acquiring an image grayscale value sent by a driving portion in the display screen; compensating a first gray level value collected by the light sensor by using the image grayscale value to obtain a current gray level value, in which the current gray level value is configured to represent a gray level corresponding to current external ambient light detected by the light sensor; and acquiring illumination intensity of the current external ambient light based on the current gray level value, in which the illumination intensity is used as a basis for adjusting backlight brightness of the display screen.

It should be understood that the above general description and the following detailed description are only exemplary and explanatory, and do not limit the present disclosure.

BRIEF DESCRIPTION OF THE DRAWINGS

The accompanying drawings, which are incorporated in and constitute a part of this disclosure, illustrate embodiments consistent with the present disclosure and, together with the description, serve to explain the principles of the present disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the present disclosure. Instead, they are merely examples of apparatuses and methods consistent with aspects related to the present disclosure as recited in the appended claims.

When images are displayed on a full screen, light leakage from backlight of the full screen may be mixed with the external ambient light, which will cause errors in the illumination intensity acquired by the light sensor, resulting in deviations in the dimming of the display screen and affecting user experience.

Various embodiments of the present disclosure provide an ambient light detection method, which may be applied to a full-screen electronic device in which the light sensor is arranged under the display screen. The display screen can be an organic light-emitting diode (OLED) display screen.

Figure 1:
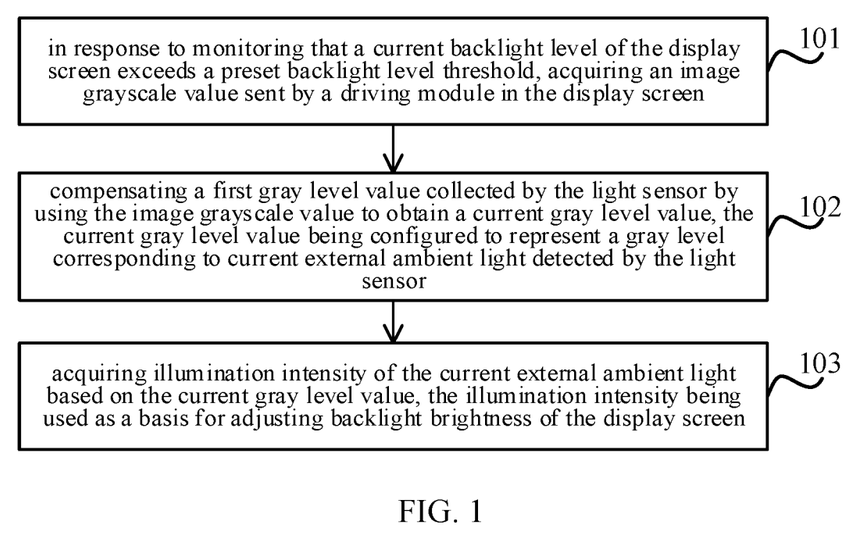
FIG. 1 is a flowchart of an ambient light detection method according to some embodiments.

FIG. 1 illustrates an ambient light detection method according to some embodiments. Referring to FIG. 1, the ambient light detection method includes acts at blocks 101 to 103.

At block 101, in response to monitoring that a current backlight level of the display screen exceeds a preset backlight level threshold, an image grayscale value sent by a driving portion in the display screen is acquired.

In some applications, there are two manners to adjust backlight of the OLED display screen.

The first one is pulse width modulation (PWM) dimming. The driving portion in the OLED display screen may use the PWM dimming to adjust the backlight brightness displayed by the OLED, that is, OLED pixels are controlled to be bright when a pulse signal is high, and the OLED display screen is controlled to be off when the pulse signal is low. In addition, controlling the brightness of the pixels is achieved by controlling the duty cycle of high-level pulses.

The second one is direct current dimming. Since the brightness of each pixel in the OLED display screen is adjusted based on the magnitude of the current flowing through OLED light-emitting tubes, when the OLED display screen requires high brightness, the current flowing into the OLED light-emitting tubes is increased; and when the OLED display screen requires low brightness, the current flowing into the OLED light-emitting tubes is reduced.

It should be noted that the OLED display screen may acquire current illumination intensity (lux) reported by the light sensor. With a preset corresponding relation table between the illumination intensity and backlight levels, the current backlight level (for example, 0~2047) may be obtained based on the current illumination intensity. In practical applications, a backlight level threshold (such as 1,000) may be preset. When the current backlight level is less than the backlight level threshold, the OLED display screen may use the PWM dimming; and when the current backlight level exceeds the backlight level threshold, the OLED display screen may use the direct current dimming.

In this embodiment, for the two dimming manners of the OLED display screen, the light sensor may be provided with two manners of light detection.

The first manner is low-light detection manner, which corresponds to a scenario where the OLED display screen uses the PWM dimming. In a time slot when the OLED display screen is off, the light sensor collects light to obtain the illumination intensity. Since there is no backlight leakage when the OLED display screen is off, all of the light collected by the light sensor is external ambient light.

The second manner is high-light detection manner (that is, the ambient light detection method according to this embodiment), which corresponds to a scenario where the OLED display screen uses the direct current dimming. Since the OLED display screen remains constantly bright, backlight leakage of the OLED display screen will interfere with the illumination intensity acquired by the light sensor. Therefore, the image grayscale value is used to correct the illumination intensity.

Considering that the OLED display screen switches the dimming manner based on the current backlight level, in this embodiment, the light sensor core in the light sensor may also switch the detection method based on the current backlight level. In this manner, the light sensor core may communicate with the driving portion in the OLED display to acquire the current backlight level.

It should be noted that the light sensor core is a processor, which may be implemented by a processing chip in the light sensor or by a processor in the electronic device. For convenience of description, the light sensor core is used for description in each embodiment of the present disclosure.

The light sensor core may compare the current backlight level with the preset backlight level threshold. When the current backlight level is smaller than the backlight level threshold, the low-light detection is used, and the detection process will not be elaborated herein. When the current backlight level exceeds the backlight level threshold, the light sensor core may determine that it is necessary to compensate subsequently detected light. The light sensor core may acquire the image grayscale value sent by the driving portion in the OLED display screen, and a corresponding gray level value (hereinafter referred to as a second gray level value).

It should be noted that the driving portion in the OLED display screen is electrically connected to the light sensor core. For example, pins of a driving chip in the driving portion are electrically connected to pins of the light sensor, so that the light sensor core may acquire frame synchronization signals sent by the driving portion. As another example, the driving portion in the OLED display screen is in communication with the light sensor core. Based on the frame synchronization signals, the OLED display screen may synchronize with the light sensor core and send the image grayscale value of a specified area to the light sensor core. The specified area refers to an overlapping area of an optical view angle of the light sensor and the OLED display screen. The image grayscale value refers to an average value of grayscale values of respective pixels in the specified area. After receiving the image grayscale value, the light sensor core may convert the image grayscale value to a gray level value (ADC count) and store the gray level value in a local register.

At block 102, a first gray level value collected by the light sensor is compensated by using the image grayscale value to obtain a current gray level value. The current gray level value is configured to represent a gray level corresponding to current external ambient light detected by the light sensor.

Figure 2:
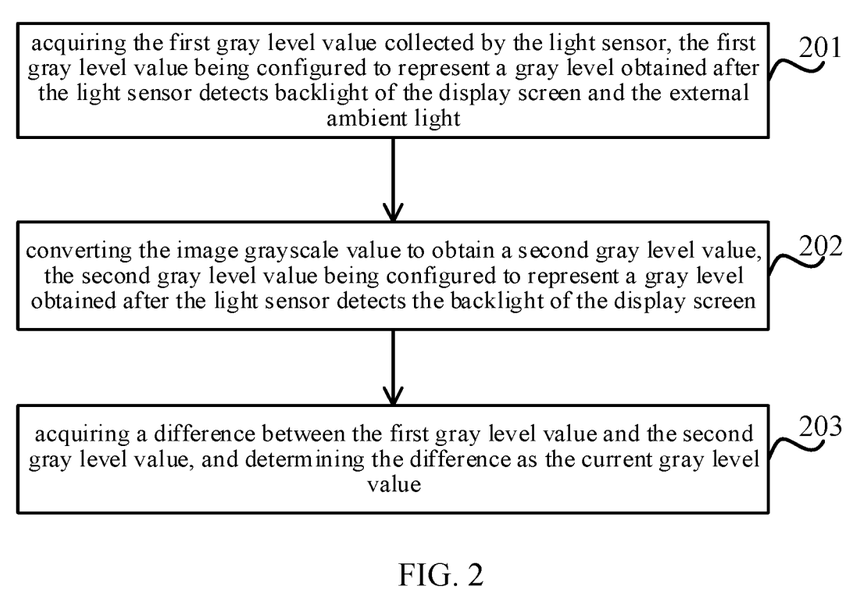
FIG. 2 is a flowchart of an ambient light detection method according to some other embodiments.

In this embodiment, referring to FIG. 2, the light sensor may collect light based on a set period. When the light is sensed, the light is converted into a photovoltage. The photovoltage is then amplified and outputted to a sampling circuit to obtain a sampled voltage. The sampled voltage is converted by an analog-to-digital converter to obtain a binary gray level value (ADC count), which is hereinafter referred to as the first gray level value (corresponding to block 201). The first gray level value represents a gray level obtained after the light sensor detects backlight of the display screen and the external ambient light. It should be noted that the gray level value may be acquired by the light sensor in other ways, and corresponding solutions fall within the protection scope of the present disclosure.

The light sensor core may acquire the image grayscale value sent by the driving portion in the OLED display screen, and convert the image grayscale value to obtain the second gray level value (corresponding to block 202). The second gray level value represents a gray level obtained after the light sensor detects the backlight of the display screen. It is understandable that since the OLED display screen adjusts the backlight based on the image grayscale value, the second gray level value may be used to represent the gray level obtained after the light sensor detects the backlight of the OLED display screen.

In some applications, the order to acquire the first gray level value and the second gray level value by the light sensor is not limited.

In this embodiment, a corresponding relation between the grayscale value and the gray level value may be preset, so that when the light sensor core needs to convert the image grayscale value, the corresponding relation between the grayscale value and the gray level value may be acquired, and then the second gray level value may be acquired based on the image grayscale value and the corresponding relation.

The corresponding relation between the grayscale value and the gray level value may be acquired as described in followings.

The electronic device is placed in a dark enclosure environment, and the OLED display screen is controlled to display images with different brightness levels. During the process of displaying an image, the light sensor may detect light to obtain the gray level value. The image grayscale value and gray level value of an image displayed in the specified area are combined to form image sample data. It should be noted that, considering that each pixel includes sub-pixels of three colors (red, green and blue), and each sub-pixel has $2^8$ brightness levels, each pixel has $2^{24}$ brightness levels, and thus t pixels in the specified area correspond to $2^{(24*t)}$ brightness levels. Therefore, preset pieces of image sample data may be selected as training samples.

A prediction model is trained by using the image sample data, and training is stopped until an error between a predicted gray level value of the prediction model and the actual gray level value is less than a preset error threshold so as to obtain the trained prediction model. The prediction model represents the corresponding relation between the grayscale value and the gray level value. The prediction model may be a deep learning algorithm, such as CNN or RNN, a linear function, a quadratic linear function, or a higher-order linear function, which is not limited herein.

With continued reference to FIG. 2, the light sensor core may acquire a difference between the first gray level value and the second gray level value, and determine the difference as the current gray level value (corresponding to block 203), that is, the gray level generated under the effect of the external ambient light on the light sensor.

At block 103, illumination intensity of the current external ambient light is acquired based on the current gray level value. The illumination intensity is used as a basis for adjusting backlight brightness of the OLED display screen.

In this embodiment, the light sensor core converts the current gray level value into the illumination intensity (lux) by using the following equation:

$$Lux' = \begin{vmatrix} Lux'_{1m} \\ \vdots \\ Lux'_{nm} \end{vmatrix} = \begin{bmatrix} K_{11}*channel_{11} & \ldots & K_{1m}*channel_{1m} \\ \vdots & \ddots & \vdots \\ K_{n1}*channel_{n1} & \ldots & K_{nm}*channel_{nm} \end{bmatrix},$$

wherein, channel represents the gray level value (i.e., ADC count) converted by each channel of the light sensor (that is, a register value of the sensor), Knm (n=1, 2, 3 . . . ) represents a coefficient obtained by fitting, n represents a type of a light source (that is, different light source spectra have different fitting calculation coefficients of illumination intensity), and m represents a number of channels in the light sensor. The equation of lux may be obtained by adding elements of vectors in corresponding rows of the matrix.

Accordingly, in embodiments of the present disclosure, the current backlight level of the OLED display screen is monitored, and in response to monitoring that the current backlight level of the OLED display screen exceeds the preset backlight level threshold, the image grayscale value sent by the driving portion in the OLED display screen is acquired. The first gray level value collected by the light sensor is compensated by using the image grayscale value to obtain the current gray level value. The current gray level value is configured to represent the gray level corresponding to current external ambient light detected by the light sensor. The illumination intensity of the current external ambient light is acquired based on the current gray level value. The illumination intensity is used as a basis for adjusting the backlight brightness of the OLED display screen. In this manner, according to embodiments of the present disclosure, compensating the gray level value collected by the light sensor based on the image grayscale value may eliminate the influence of backlight on the illumination intensity, and improve the accuracy of the illumination intensity detected, and thus the backlight of the OLED display screen is matched with the external environment, and the user experience of using the electronic device is improved.

Figure 3:
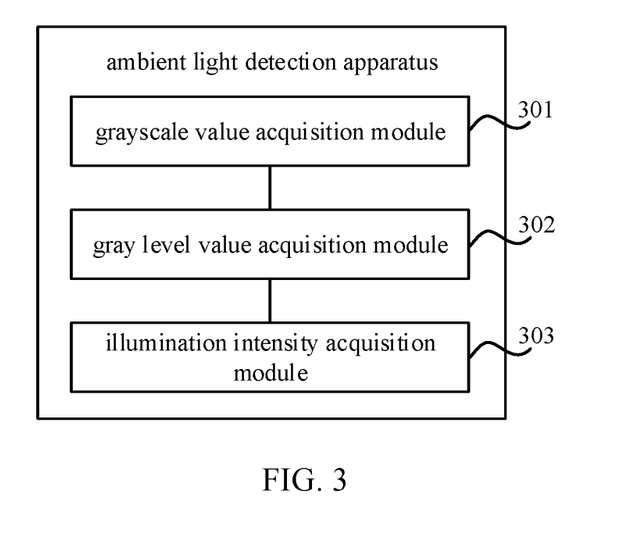
FIG. 3 is a first block diagram of an ambient light detection apparatus according to some embodiments.

FIG. 3 is an ambient light detection apparatus according to some embodiments, which is applied to an electronic device with a light sensor arranged under a display screen. Referring to FIG. 3, the ambient light detection apparatus includes a grayscale value acquisition portion 301, a gray level value acquisition portion 302, and an illumination intensity acquisition portion 303.

The grayscale value acquisition portion 301 is configured to, in response to monitoring that a current backlight level of the display screen exceeds a preset backlight level threshold, acquire an image grayscale value sent by a driving portion in the display screen.

The gray level value acquisition portion 302 is configured to compensate a first gray level value collected by the light sensor by using the image grayscale value to obtain a current gray level value. The current gray level value is configured to represent a gray level corresponding to current external ambient light detected by the light sensor.

The illumination intensity acquisition portion 303 is configured to acquire illumination intensity of the current external ambient light based on the current gray level value. The illumination intensity is used as a basis for adjusting backlight brightness of the display screen.

Figure 4:
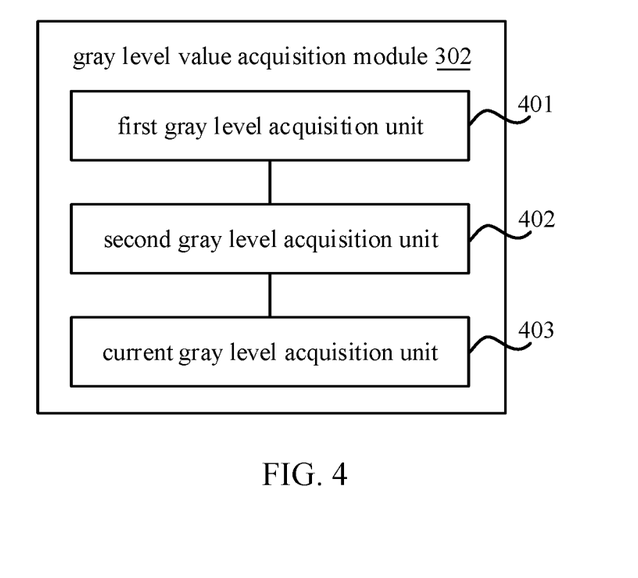
FIG. 4 is a second block diagram of an ambient light detection apparatus according to some embodiments.

In an embodiment, referring to FIG. 4, the gray level value acquisition portion 302 includes a first gray level acquisition component 401, a second gray level acquisition component 402 and a current gray level acquisition component 403.

The first gray level acquisition component 401 is configured to acquire the first gray level value collected by the light sensor. The first gray level value is configured to represent a gray level obtained after the light sensor detects backlight of the display screen and the external ambient light.

The second gray level acquisition component 402 is configured to convert the image grayscale value to obtain a second gray level value. The second gray level value is configured to represent a gray level obtained after the light sensor detects the backlight of the display screen.

The current gray level acquisition component 403 is configured to acquire a difference between the first gray level value and the second gray level value, and to determine the difference as the current gray level value.

Figure 5:
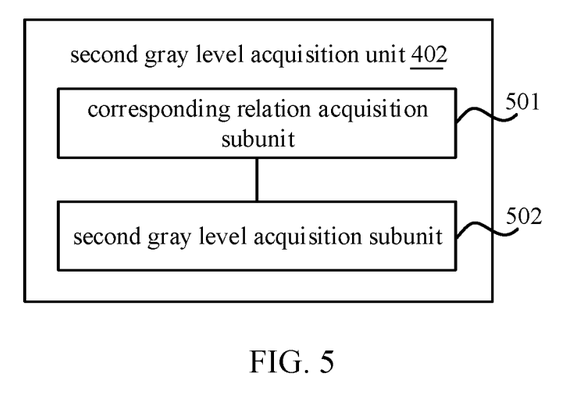
FIG. 5 is a third block diagram of an ambient light detection apparatus according to some embodiments.

In an embodiment, referring to FIG. 5, the second gray level acquisition component 402 includes a corresponding relation acquisition subcomponent 501 and a second gray level acquisition subcomponent 502.

The corresponding relation acquisition subcomponent 501 is configured to acquire a corresponding relation between a grayscale value and a gray level value set in advance.

The second gray level acquisition subcomponent 502 is configured to acquire the second gray level value based on the image grayscale value and the corresponding relation.

Figure 6:
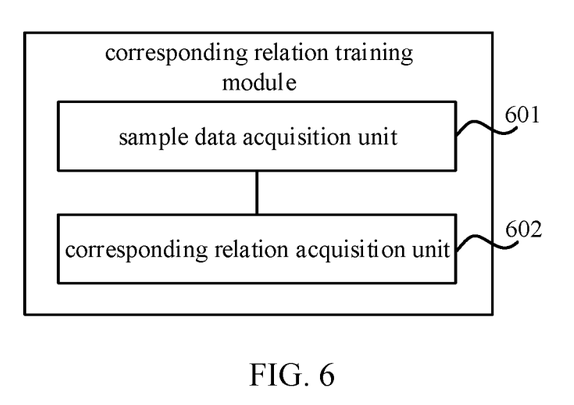
FIG. 6 is a fourth block diagram of an ambient light detection apparatus according to some embodiments.

In an embodiment, referring to FIG. 6, the apparatus further includes a corresponding relation training portion. The corresponding relation training portion includes a sample data acquisition component 601 and a corresponding relation acquisition component 602.

The sample data acquisition component 601 is configured to acquire image sample data of a preset number of images. The image sample data includes an image grayscale value of an image displayed in a specified area of the display screen and an actual gray level value detected by the light sensor in a dark enclosure environment. The specified area refers to an overlapping area of an optical view angle of the light sensor and the display screen.

The corresponding relation acquisition component 602 is configured to train a prediction model by using the image sample data, and to stop training until an error between a predicted gray level value of the prediction model and the actual gray level value is less than a preset error threshold so as to obtain the trained prediction model. The prediction model represents the corresponding relation between the grayscale value and the gray level value.

In an embodiment, the first gray level acquisition component is further configured to, in response to monitoring that the current backlight level of the display screen is less than the preset backlight level threshold, acquire the first gray level value collected by the light sensor in a preset time slot, and determine the first gray level value as the current gray level value.

It is understandable that the apparatus according to embodiments of the present disclosure corresponds to the above method. Reference to specific content may be made to the content of each method embodiment, and will not be repeated here.

Figure 7:
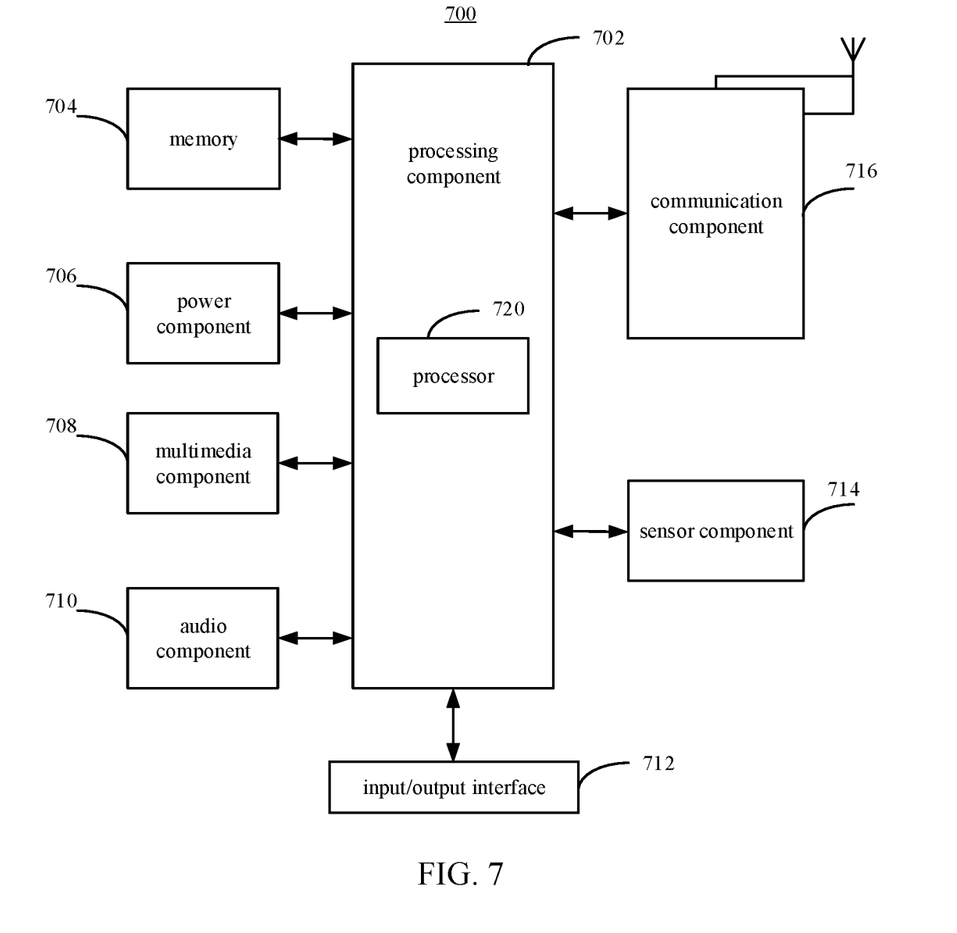
FIG. 7 is a block diagram of an electronic device according to some embodiments.

FIG. 7 is a block diagram of an electronic device 700 according to some embodiments. For example, the electronic device 700 may be a mobile phone, a computer, a digital broadcast terminal, a tablet device, a medical device, an exercise device, a personal digital assistant, and so on.

Referring to FIG. 7, the electronic device 700 may include one or more of the following components: a processing component 702, a memory 704, a power component 706, a multimedia component 708, an audio component 710, an input/output (I/O) interface 712, a sensor component 714, a communication component 716, and an image acquisition component 718.

The processing component 702 normally controls the overall operation (such as operations associated with displaying, telephone calls, data communications, camera operations and recording operations) of the electronic device 700. The processing component 702 may include one or a plurality of processors 720 to execute instructions. In addition, the processing component 702 may include one or a plurality of components to facilitate interactions between the processing component 702 and other components. For example, the processing component 702 may include a multimedia component to facilitate interactions between the multimedia component 708 and the processing component 702.

The memory 704 is configured to store various types of data to support operations at the electronic device 700. Examples of such data include instructions for any application or method operated on the electronic device 700, contact data, phone book data, messages, images, videos and the like. The memory 704 may be realized by any type of volatile or non-volatile storage devices, or a combination thereof, such as a static random access memory (SRAM), an electrically erasable programmable read only memory (EEPROM), an erasable programmable read only memory (EPROM), a programmable read only memory (PROM), a read only memory (ROM), a magnetic memory, a flash memory, a disk or an optical disk.

The power component 706 provides power to various components of the electronic device 700. The power component 706 may include a power management system, one or a plurality of power sources and other components associated with power generation, management, and distribution of the electronic device 700.

The multimedia component 708 includes a screen that provides an output interface between the electronic device 700 and the user. In some embodiments, the screen may include a liquid crystal display (LCD) and a touch panel (TP). In some embodiments, an organic light-emitting diode (OLED) display may be employed.

If the screen includes a touch panel, the screen may be implemented as a touch screen to receive input signals from the user. The touch panel includes one or a plurality of touch sensors to sense touches, slides, and gestures on the touch panel. The touch sensor may sense not only the boundary of the touches or sliding actions, but also the duration and pressure related to the touches or sliding operations.

The audio component 710 is configured to output and/or input an audio signal. For example, the audio component 710 includes a microphone (MIC) that is configured to receive an external audio signal when the electronic device 700 is in an operation mode such as a call mode, a recording mode, and a voice recognition mode. The received audio signal may be further stored in the memory 704 or transmitted via the communication component 716. In some embodiments, the audio component 710 further includes a speaker for outputting audio signals.

The I/O interface 712 provides an interface between the processing component 702 and a peripheral interface component. The peripheral interface component may be a keyboard, a click wheel, a button and so on.

The sensor assembly 714 includes one or a plurality of sensors for providing the electronic device 700 with various aspects of status assessments. For example, the sensor component 714 may detect an open/closed state of the electronic device 700 and a relative positioning of the components. For example, the components may be a display and a keypad of the electronic device 700. The sensor component 714 may also detect a change in position of the electronic device 700 or a component of the electronic device 700, the presence or absence of contact of a target object with the electronic device 700, the orientation or acceleration/deceleration of the electronic device 700 and a temperature change of the electronic device 700. For another example, the sensor component 714 may also include a light sensor arranged under the display screen. The light sensor core in the light sensor may execute instructions to implement steps of the method illustrated in FIGS. 1 to 2.

The communication component 716 is configured to facilitate wired or wireless communication between the electronic device 700 and other devices. The electronic device 700 may access a wireless network based on a communication standard such as Wi-Fi, 2G or 3G, or a combination thereof. In some embodiments, the communication component 716 receives broadcast signals or broadcast-associated information from an external broadcast management system via a broadcast channel. In some embodiments, the communication component 716 further includes a near field communication (NFC) component to facilitate short range communication. For example, the NFC portion may be implemented based on radio frequency identification (RFID) technology, infrared data association (IrDA) technology, ultra-wideband (UWB) technology, Bluetooth (BT) technology and other technologies.

In some embodiments, the electronic device 700 may be implemented by one or a plurality of application specific integrated circuits (ASICs), digital signal processors (DSPs), digital signal processing devices (DSPDs), programmable logic devices (PLDs), field programmable gate arrays (FPGA), controllers, microcontrollers, microprocessors, or other electronic components.

In some embodiments, there is also provided a non-transitory computer-readable storage medium including instructions, such as a memory 704 including instructions. The instructions are executable by the light sensor core of the light sensor. For example, the readable storage medium may be a ROM, a random-access memory (RAM), a CD-ROM, a magnetic tape, a floppy disk, an optical data storage device, etc.

The various device components, modules, units, circuits, sub-circuits, blocks, or portions may have modular configurations, or are composed of discrete components, but nonetheless can be referred to as "modules" in general. In other words, the "components," "modules," "units," "circuits," "sub-circuits," "blocks," or "portions" referred to herein may or may not be in modular forms, and these phrases may be interchangeably used.

In the present disclosure, the terms "installed," "connected," "coupled," "fixed" and the like shall be understood broadly, and can be either a fixed connection or a detachable connection, or integrated, unless otherwise explicitly defined. These terms can refer to mechanical or electrical connections, or both. Such connections can be direct connections or indirect connections through an intermediate medium. These terms can also refer to the internal connections or the interactions between elements. The specific meanings of the above terms in the present disclosure can be understood by those of ordinary skill in the art on a case-by-case basis.

In the description of the present disclosure, the terms "one embodiment," "some embodiments," "example," "specific example," or "some examples," and the like can indicate a specific feature described in connection with the embodiment or example, a structure, a material or feature included in at least one embodiment or example. In the present disclosure, the schematic representation of the above terms is not necessarily directed to the same embodiment or example.

Moreover, the particular features, structures, materials, or characteristics described can be combined in a suitable manner in any one or more embodiments or examples. In addition, various embodiments or examples described in the specification, as well as features of various embodiments or examples, can be combined and reorganized.

In some embodiments, the control and/or interface software or app can be provided in a form of a non-transitory computer-readable storage medium having instructions stored thereon is further provided. For example, the non-transitory computer-readable storage medium can be a ROM, a CD-ROM, a magnetic tape, a floppy disk, optical data storage equipment, a flash drive such as a USB drive or an SD card, and the like.

Implementations of the subject matter and the operations described in this disclosure can be implemented in digital electronic circuitry, or in computer software, firmware, or hardware, including the structures disclosed herein and their structural equivalents, or in combinations of one or more of them. Implementations of the subject matter described in this disclosure can be implemented as one or more computer programs, i.e., one or more portions of computer program instructions, encoded on one or more computer storage medium for execution by, or to control the operation of, data processing apparatus.

Alternatively, or in addition, the program instructions can be encoded on an artificially-generated propagated signal, e.g., a machine-generated electrical, optical, or electromagnetic signal, which is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them.

Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, drives, or other storage devices). Accordingly, the computer storage medium can be tangible.

The operations described in this disclosure can be implemented as operations performed by a data processing apparatus on data stored on one or more computer-readable storage devices or received from other sources.

The devices in this disclosure can include special purpose logic circuitry, e.g., an FPGA (field-programmable gate array), or an ASIC (application-specific integrated circuit). The device can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The devices and execution environment can realize various different computing model infrastructures, such as web services, distributed computing, and grid computing infrastructures.

A computer program (also known as a program, software, software application, app, script, or code) can be written in any form of programming language, including compiled or interpreted languages, declarative or procedural languages, and it can be deployed in any form, including as a stand-alone program or as a portion, component, subroutine, object, or other portion suitable for use in a computing environment. A computer program can, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more portions, sub-programs, or portions of code). A computer program can be deployed to be executed on one computer or on multiple computers that are located at one site or distributed across multiple sites and interconnected by a communication network.

The processes and logic flows described in this disclosure can be performed by one or more programmable processors executing one or more computer programs to perform actions by operating on input data and generating output. The processes and logic flows can also be performed by, and apparatus can also be implemented as, special purpose logic circuitry, e.g., an FPGA, or an ASIC.

Processors or processing circuits suitable for the execution of a computer program include, by way of example, both general and special purpose microprocessors, and any one or more processors of any kind of digital computer. Generally, a processor will receive instructions and data from a read-only memory, or a random-access memory, or both. Elements of a computer can include a processor configured to perform actions in accordance with instructions and one or more memory devices for storing instructions and data.

Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented with a computer and/or a display device, e.g., a VR/AR device, a head-mount display (HMD) device, a head-up display (HUD) device, smart eyewear (e.g., glasses), a CRT (cathode-ray tube), LCD (liquid-crystal display), OLED (organic light emitting diode), or any other monitor for displaying information to the user and a keyboard, a pointing device, e.g., a mouse, trackball, etc., or a touch screen, touch pad, etc., by which the user can provide input to the computer.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components.

The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While this specification contains many specific implementation details, these should not be construed as limitations on the scope of any claims, but rather as descriptions of features specific to particular implementations. Certain features that are described in this specification in the context of separate implementations can also be implemented in combination in a single implementation. Conversely, various features that are described in the context of a single implementation can also be implemented in multiple implementations separately or in any suitable subcombination.

Moreover, although features can be described above as acting in certain combinations and even initially claimed as such, one or more features from a claimed combination can in some cases be excised from the combination, and the claimed combination can be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the implementations described above should not be understood as requiring such separation in all implementations, and it should be understood that the described program components and systems can generally be integrated together in a single software product or packaged into multiple software products.

As such, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing can be utilized.

It is intended that the specification and embodiments be considered as examples only. Other embodiments of the disclosure will be apparent to those skilled in the art in view of the specification and drawings of the present disclosure. That is, although specific embodiments have been described above in detail, the description is merely for purposes of illustration. It should be appreciated, therefore, that many aspects described above are not intended as required or essential elements unless explicitly stated otherwise.

Various modifications of, and equivalent acts corresponding to, the disclosed aspects of the example embodiments, in addition to those described above, can be made by a person of ordinary skill in the art, having the benefit of the present disclosure, without departing from the spirit and scope of the disclosure defined in the following claims, the scope of which is to be accorded the broadest interpretation so as to encompass such modifications and equivalent structures.

It should be understood that "a plurality" or "multiple" as referred to herein means two or more. "And/or," describing the association relationship of the associated objects, indicates that there may be three relationships, for example, A and/or B may indicate that there are three cases where A exists separately, A and B exist at the same time, and B exists separately. The character "/" generally indicates that the contextual objects are in an "or" relationship.

In the present disclosure, it is to be understood that the terms "lower," "upper," "under" or "beneath" or "underneath," "above," "front," "back," "left," "right," "top," "bottom," "inner," "outer," "horizontal," "vertical," and other orientation or positional relationships are based on example orientations illustrated in the drawings, and are merely for the convenience of the description of some embodiments, rather than indicating or implying the device or component being constructed and operated in a particular orientation. Therefore, these terms are not to be construed as limiting the scope of the present disclosure.

Moreover, the terms "first" and "second" are used for descriptive purposes only and are not to be construed as indicating or implying a relative importance or implicitly indicating the number of technical features indicated. Thus, elements referred to as "first" and "second" may include one or more of the features either explicitly or implicitly. In the description of the present disclosure, "a plurality" indicates two or more unless specifically defined otherwise.

In the present disclosure, a first element being "on" a second element may indicate direct contact between the first and second elements, without contact, or indirect geometrical relationship through one or more intermediate media or layers, unless otherwise explicitly stated and defined. Similarly, a first element being "under," "underneath" or "beneath" a second element may indicate direct contact between the first and second elements, without contact, or indirect geometrical relationship through one or more intermediate media or layers, unless otherwise explicitly stated and defined.

Some other embodiments of the present disclosure can be available to those skilled in the art upon consideration of the specification and practice of the various embodiments disclosed herein. The present application is intended to cover any variations, uses, or adaptations of the present disclosure following general principles of the present disclosure and include the common general knowledge or conventional technical means in the art without departing from the present disclosure. The specification and examples can be shown as illustrative only, and the true scope and spirit of the disclosure are indicated by the following claims.

The invention claimed is:

1. An ambient light detection method, applied to an electronic device with a light sensor arranged under a display screen, comprising:
   in response to monitoring that a current backlight level of the display screen exceeds a preset backlight level threshold, acquiring an image grayscale value sent by a driving portion in the display screen, wherein the image grayscale value represents an average value of grayscale values of respective pixels in a specified area, and the image grayscale value and gray level value of an image displayed in the specified area are combined to form image sample data;
   compensating a first gray level value collected by the light sensor by using the image grayscale value to obtain a current gray level value, the current gray level value being configured to represent a gray level corresponding to current external ambient light detected by the light sensor; and
   acquiring illumination intensity of the current external ambient light based on the current gray level value, the illumination intensity being used as a basis for adjusting backlight brightness of the display screen.

2. The ambient light detection method of claim 1, wherein the compensating the first gray level value collected by the light sensor by using the image grayscale value to obtain the current gray level value comprises:
   acquiring the first gray level value collected by the light sensor, the first gray level value being configured to represent a gray level obtained after the light sensor detects backlight of the display screen and the external ambient light;
   converting the image grayscale value to obtain a second gray level value, the second gray level value being configured to represent a gray level obtained after the light sensor detects the backlight of the display screen; and
   acquiring a difference between the first gray level value and the second gray level value, and determining the difference as the current gray level value.

3. The ambient light detection method of claim 2, wherein the converting the image grayscale value to obtain the second gray level value comprises:
   acquiring a corresponding relation between a grayscale value and a gray level value set in advance; and
   acquiring the second gray level value based on the image grayscale value and the corresponding relation.

4. The ambient light detection method of claim 3, wherein the corresponding relation is acquired by:
   acquiring image sample data of a preset number of images, the image sample data comprising an image grayscale value of an image displayed in a specified area of the display screen and an actual gray level value detected by the light sensor in a dark enclosure environment, and the specified area referring to an overlapping area of an optical view angle of the light sensor and the display screen; and
   training a prediction model by using the image sample data, and stopping training until an error between a predicted gray level value of the prediction model and the actual gray level value is less than a preset error threshold so as to obtain the trained prediction model, the prediction model representing the corresponding relation between the grayscale value and the gray level value.

5. The ambient light detection method of claim 1, further comprising:
   in response to monitoring that the current backlight level of the display screen is less than the preset backlight level threshold, acquiring the first gray level value collected by the light sensor in a preset time slot, and determining the first gray level value as the current gray level value.

6. A mobile terminal implementing the method of claim 1, comprising the display screen and the light sensor arranged under the display screen.

7. The mobile terminal of claim 6, wherein the display screen is an organic light-emitting diode (OLED) display screen.

8. The mobile terminal of claim 7, wherein the mobile terminal is configured to compensate the gray level value collected by the light sensor based on the image grayscale value to thereby reduce or eliminate influence of backlight on the illumination intensity, and improve accuracy of the illumination intensity detected.

9. The mobile terminal of claim 8, wherein the mobile terminal is configured to match the backlight of the OLED display screen with an external environment, unaffected by light leakage from the display screen.

10. The mobile terminal of claim 9, wherein the OLED display screen is a full screen of the mobile terminal.

11. The mobile terminal of claim 10, wherein the mobile terminal is further configured to:
   acquire the first gray level value collected by the light sensor, the first gray level value being configured to represent a gray level obtained after the light sensor detects backlight of the display screen and the external ambient light;
   convert the image grayscale value to obtain a second gray level value, the second gray level value being configured to represent a gray level obtained after the light sensor detects the backlight of the display screen; and acquire a difference between the first gray level value and the second gray level value, and determining the difference as the current gray level value.

12. The mobile terminal of claim 11, wherein the mobile terminal is further configured to:
   acquire a corresponding relation between a grayscale value and a gray level value set in advance; and
   acquire the second gray level value based on the image grayscale value and the corresponding relation.

13. The mobile terminal of claim 12, wherein the corresponding relation is acquired by:
   acquiring image sample data of a preset number of images, the image sample data comprising an image grayscale value of an image displayed in a specified area of the display screen and an actual gray level value detected by the light sensor in a dark enclosure environment, and the specified area referring to an overlapping area of an optical view angle of the light sensor and the display screen; and
   training a prediction model by using the image sample data, and stopping training until an error between a predicted gray level value of the prediction model and the actual gray level value is less than a preset error threshold so as to obtain the trained prediction model, the prediction model representing the corresponding relation between the grayscale value and the gray level value.

14. The mobile terminal of claim 13, wherein the mobile terminal is further configured to:
   in response to monitoring that the current backlight level of the display screen is less than the preset backlight level threshold, acquire the first gray level value collected by the light sensor in a preset time slot, and determining the first gray level value as the current gray level value.

15. An ambient light detection apparatus, applied to an electronic device with a light sensor arranged under a display screen, comprising:
   one or more processors;
   a memory device storing instructions executable by the one or more processors;
   wherein the one or more processors are configured to:
   in response to monitoring that a current backlight level of the display screen exceeds a preset backlight level threshold, acquire an image grayscale value sent by a driving portion in the display screen, wherein the image grayscale value represents an average value of grayscale values of respective pixels in a specified area, and the image grayscale value and gray level value of an image displayed in the specified area are combined to form image sample data;
   compensate a first gray level value collected by the light sensor by using the image grayscale value to obtain a current gray level value, the current gray level value being configured to represent a gray level corresponding to current external ambient light detected by the light sensor; and
   acquire illumination intensity of the current external ambient light based on the current gray level value, the illumination intensity being used as a basis for adjusting backlight brightness of the display screen.

16. The ambient light detection apparatus of claim 15, wherein the one or more processors are configured to:
   acquire the first gray level value collected by the light sensor, the first gray level value being configured to represent a gray level obtained after the light sensor detects backlight of the display screen and the external ambient light;
   convert the image grayscale value to obtain a second gray level value, the second gray level value being configured to represent a gray level obtained after the light sensor detects the backlight of the display screen; and
   acquire a difference between the first gray level value and the second gray level value, and to determine the difference as the current gray level value.

17. The ambient light detection apparatus of claim 16, wherein the one or more processors are configured to:
   acquire a corresponding relation between a grayscale value and a gray level value set in advance; and
   acquire the second gray level value based on the image grayscale value and the corresponding relation.

18. The ambient light detection apparatus of claim 17, wherein the one or more processors are configured to:
   acquire image sample data of a preset number of images, the image sample data comprising an image grayscale value of an image displayed in a specified area of the display screen and an actual gray level value detected by the light sensor in a dark enclosure environment, and the specified area referring to an overlapping area of an optical view angle of the light sensor and the display screen; and
   train a prediction model by using the image sample data, and to stop training until an error between a predicted gray level value of the prediction model and the actual gray level value is less than a preset error threshold so as to obtain the trained prediction model, the prediction model representing the corresponding relation between the grayscale value and the gray level value.

19. The ambient light detection apparatus of claim 15, wherein the one or more processors are configured to, in response to monitoring that the current backlight level of the display screen is less than the preset backlight level threshold, acquire the first gray level value collected by the light sensor in a preset time slot, and determine the first gray level value as the current gray level value.

20. A non-transitory computer-readable storage medium having instructions stored thereon for execution by a processing circuit to implement operations of an ambient light detection method applied to an electronic device with a light sensor arranged under a display screen, the method comprising:
   in response to monitoring that a current backlight level of the display screen exceeds a preset backlight level threshold, acquiring an image grayscale value sent by a driving portion in the display screen, wherein the image grayscale value represents an average value of grayscale values of respective pixels in a specified area, and the image grayscale value and gray level value of an image displayed in the specified area are combined to form image sample data;
   compensating a first gray level value collected by the light sensor by using the image grayscale value to obtain a current gray level value, the current gray level value being configured to represent a gray level corresponding to current external ambient light detected by the light sensor; and
   acquiring illumination intensity of the current external ambient light based on the current gray level value, the illumination intensity being used as a basis for adjusting backlight brightness of the display screen.

* * * * *